United States Patent
Lim et al.

(10) Patent No.: US 9,285,209 B2
(45) Date of Patent: Mar. 15, 2016

(54) APPARATUS AND METHOD FOR GENERATING TOMOGRAPHY IMAGE

(71) Applicants: Samsung Electronics Co., Ltd., Suwon-si (KR); Korea Advanced Institute of Science and Technology, Daejeon (KR)

(72) Inventors: Jae-guyn Lim, Seongnam-si (KR); Jae-duck Jang, Suwon-si (KR); YongKeun Park, Daejeon (KR); Hyeonseung Yu, Daejeon (KR); Woo-young Jang, Seongnam-si (KR)

(73) Assignees: SAMSUNG ELECTRONICS CO., LTD., Suwon-si (KR); KOREA ADVANCED INSTITUTE OF SCIENCE AND TECHNOLOGY, Daejeon-si (KR)

( * ) Notice: Subject to any disclaimer, the term of this patent is extended or adjusted under 35 U.S.C. 154(b) by 0 days.

(21) Appl. No.: 14/469,692

(22) Filed: Aug. 27, 2014

(65) Prior Publication Data
US 2015/0131104 A1 May 14, 2015

(30) Foreign Application Priority Data

Nov. 8, 2013 (KR) .................. 10-2013-0135839

(51) Int. Cl.
*G01B 11/02* (2006.01)
*G01B 9/02* (2006.01)

(52) U.S. Cl.
CPC ........ *G01B 9/02084* (2013.01); *G01B 9/02083* (2013.01); *G01B 9/02091* (2013.01)

(58) Field of Classification Search
CPC .. G01B 9/02; G01B 11/2441; G01N 21/4795; A61B 5/0066; A61B 3/102
USPC ........................................ 356/497
See application file for complete search history.

(56) References Cited

U.S. PATENT DOCUMENTS

| | | | | |
|---|---|---|---|---|
| 5,513,237 A * | 4/1996 | Nobuta et al. | .................. | 378/19 |
| 2005/0254709 A1* | 11/2005 | Geshwind et al. | ............ | 382/182 |
| 2006/0291710 A1* | 12/2006 | Wang et al. | .............. | 382/131 |
| 2007/0263226 A1* | 11/2007 | Kurtz et al. | .................. | 356/492 |
| 2012/0121147 A1* | 5/2012 | Huang et al. | ................. | 382/131 |

* cited by examiner

*Primary Examiner* — Tarifur Chowdhury
*Assistant Examiner* — Md M Rahman
(74) *Attorney, Agent, or Firm* — Sughrue Mion, PLLC

(57) ABSTRACT

Provided are a tomography image generating method and an apparatus for generating a tomography image. The method of generating a tomography image includes, in response to a depth scan operation performed on an object, generating a candidate tomography image by using an interference signal acquired by the performed depth scan operation, determining a pixel pattern by using the generated candidate tomography image; and when the depth scan operation performed on the object is completed, generating a final tomography image of the object by using a finally determined pixel pattern. The generating the candidate tomography image and the determining are parallel processed by at least one processor during the depth scan operation being repeatedly performed.

20 Claims, 11 Drawing Sheets

APPARATUS AND METHOD FOR GENERATING TOMOGRAPHY IMAGE

RELATED APPLICATIONS

This application claims priority from Korean Patent Application No. 10-2013-0135839, filed on Nov. 8, 2013 in the Korean Intellectual Property Office, the disclosure of which is incorporated herein in its entirety by reference.

BACKGROUND

1. Field

Apparatuses and methods consistent with exemplary embodiments relate to generating a tomography image by using light.

2. Description of the Related Art

Light is applied to various fields by using characteristics of light such as monochromaticity, coherence, and directionality. In a bio field and a medical field, light is variously used to observe a tissue or a cell, diagnose a disease, and perform a laser procedure.

By using various characteristics of light, it is possible to capture a higher resolution image of a living tissue or cell, and thus, an internal structure of a human body or a living organism may be observed without incising the human body or the living organism. In the medical field, light is used to easily and stably determine causes, positions, and progress of various diseases. In capturing a tomography image of a human body by using light, a transmission depth of the light is required to increase in order for the light to pass through a cell or tissue which is located at a deeper part of a human body or a living organism.

SUMMARY

One or more exemplary embodiments provide a tomography image generating method and apparatus that generate a tomography image by using light.

One or more exemplary embodiments also provide a non-transitory computer-readable storage medium storing a program for executing the method by a computer.

According to an aspect of an exemplary embodiment, a method of generating a tomography image includes: in response to a depth scan operation performed on an object, generating a candidate tomography image by using an interference signal acquired by the performed depth scan operation; determining a pixel pattern by using the generated candidate tomography image; and when the depth scan operation performed on the object is completed, generating a final tomography image of the object by using a finally determined pixel pattern, wherein the generating and the determining are parallel processed by at least one processor during the depth scan operation being repeatedly performed.

The at least one processor may parallel process a first thread for performing the depth scan operation, a second thread for generating the candidate tomography image, and a third thread for determining the pixel pattern.

The depth scan operation may be repeatedly performed by using at least one from among a plurality of basis patterns and a plurality of shift patterns, the plurality of shift patterns being obtained by applying spatial shift modulation to the plurality of basis patterns.

The plurality of basis patterns may include uncorrelated patterns.

The depth scan operation may be repeatedly performed for each spot of a surface of the object by using the at least one from among the plurality of basis patterns and the plurality of shift patterns.

The generating the final tomography image of the object may be performed when the depth scan operation is completed for a spot of the surface of the object by using the at least one from among the plurality of basis patterns and the plurality of shift patterns.

The pixel pattern may be a pixel pattern that is adjusted by a digital micromirror device (DMD), and the depth scan operation may be repeatedly performed by using at least one from among a plurality of basis patterns and a plurality of shift patterns which are obtained through adjustment by the DMD.

The determining may include comparing intensities of pixels corresponding to a region of interest (ROI) of the object in one or more the generated candidate tomography images and determining the pixel pattern based on a result of the comparison.

The determining the pixel pattern may include: comparing intensities in units of pixels of substantially the same depth within a depth range corresponding to the ROI; combining pixel patterns respectively corresponding to the generated one or more candidate tomography images, the combined pixel patterns including a pixel having a greatest intensity at every depth unit, according to a result of the comparison; and determining the pixel pattern by using the combined pixel patterns.

The comparing and the combining may be performed in units of a certain number of pixels.

The combining may include performing summation or weighted summation on corresponding pixel patterns.

The depth scan operation may be performed by at least one from among an optical coherent tomography (OCT) apparatus and an optical coherent microscopy (OCM) apparatus.

According to an aspect of another exemplary embodiment, provided is a non-transitory computer-readable storage medium storing a program for executing the method by a computer.

According to an aspect of another exemplary embodiment, an apparatus of generating a tomography image includes at least one processor which implements: an image generator configured to, in response to a depth scan operation performed on an object, generate a candidate tomography image by using an interference signal acquired by the performed depth scan operation; and a pattern determiner configured to determine a pixel pattern by using the generated candidate tomography image, wherein, when the depth scan operation performed on the object is completed, the image generator generates a final tomography image of the object by using a finally determined pixel pattern, and during the depth scan operation being repeatedly performed, an operation of generating the candidate tomography image and an operation of determining the pixel pattern are parallel processed.

The at least one processor may parallel process a first thread for performing the depth scan operation, a second thread for generating the candidate tomography image, and a third thread for determining the pixel pattern.

The depth scan operation may be repeatedly performed by using at least one from among a plurality of basis patterns and a plurality of shift patterns of a spatial light modulator, the plurality of shift patterns being obtained by applying spatial shift modulation to the plurality of basis patterns.

The spatial light modulator may include a digital micromirror device (DMD).

The pattern determiner may compare intensities of pixels corresponding to a region of interest (ROI) of the object in one or more generated candidate tomography images and determine the pixel pattern according to a result of the comparison.

The pattern determiner may include: an intensity comparator configured to compare intensities in units of pixels of substantially the same depth within a depth range corresponding to the ROI; and a pattern combiner configured to combine pixel patterns respectively corresponding to the generated one or more candidate tomography images, the combined pixel patterns including a pixel having a greatest intensity at every depth unit, according to a result of the comparison, and the pattern determiner may determine the pixel pattern by using the combined pixel patterns.

The intensity comparator may compare the intensities, and the pattern combiner may combine the corresponding pixel patterns, in units of a certain number of pixels.

According to an aspect of still another exemplary embodiment, a method of generating a tomography image may include generating, in a first period, a first candidate tomography image by using an interference signal acquired by a first depth scan operation performed on an object; determining, in the first period, a pixel pattern by using the first candidate tomography image; generating, in a second period, a second candidate tomography image by using an interference signal acquired by a second depth scan operation performed on the object; and updating the determined pixel pattern by using the second candidate tomography image.

The second depth scan operation may be performed in the first period.

BRIEF DESCRIPTION OF THE DRAWINGS

These and/or other aspects will become apparent and more readily appreciated from the following description of certain exemplary embodiments, taken in conjunction with the accompanying drawings in which.

DETAILED DESCRIPTION OF EXEMPLARY EMBODIMENTS

Figure 1:
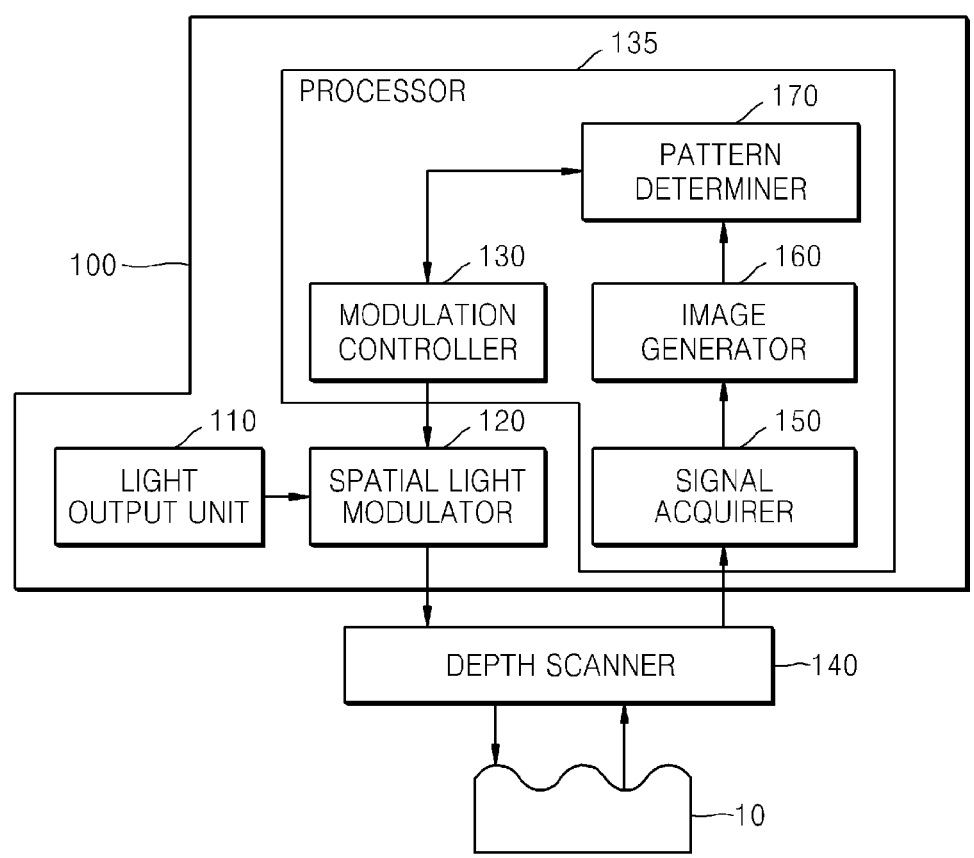
FIG. 1 is a block diagram of a tomography image generating apparatus according to an exemplary embodiment.

Reference will now be made in detail to certain exemplary embodiments, which are illustrated in the accompanying drawings, wherein like reference numerals refer to like elements throughout. In this regard, exemplary embodiments may have different forms and should not be construed as being limited to the descriptions set forth herein. Accordingly, exemplary embodiments are merely described below, by referring to the figures, to explain aspects of the disclosure. Expressions such as "at least one of," when preceding a list of elements, modify the entire list of elements and do not modify the individual elements of the list.

Hereinafter, certain exemplary embodiments will be described in detail with reference to the accompanying drawings.

FIG. 1 is a block diagram of a tomography image generating apparatus according to an exemplary embodiment.

Referring to FIG. 1, a tomography image generating apparatus 100 includes a light output unit 110, a spatial light modulator (SLM) 120, a modulation controller 130, a depth scanner 140, a signal acquirer 150, an image generator 160, and a pattern determiner 170.

In FIG. 1, the modulation controller 130, the signal acquirer 150, the image generator 160, and the pattern determiner 170 may be included in a processor 135. Here, the processor 135 may include at least one processor module. The processor 135 may include a processor, a microprocessor, a central processing unit (CPU), or an integrated circuit for executing programmable instructions stored in a storage, e.g., a memory.

The tomography image generating apparatus 100 of FIG. 1 is illustrated as including the above elements associated with the present exemplary embodiment, for preventing the feature of the present embodiment from being obscured. However, it can be understood by those skilled in the art that the tomography image generating apparatus 100 may further include general-use elements in addition to the elements of FIG. 1.

The tomography image generating apparatus 100 according to an exemplary embodiment is an apparatus that acquires a tomography image of an object by using light, and includes any type of optical imaging apparatuses that acquire a tomography image based on optical coherence. For example, the tomography image generating apparatus 100 may include an optical coherent tomography (OCT) apparatus, an optical coherent microscopy (OCM) apparatus, and an optical microscope.

The light output unit 110 outputs rays to be incident onto an object 10. Here, the light output unit 110 may output wavelength-swept light, laser, or the like, but is not limited thereto. The rays output from the light output unit 110 are reflected by the SLM 120, and are incident onto the object 10.

The SLM 120 modulates an intensity or a phase of an incident ray according to a pixel pattern.

The intensities or phases of the rays output from the light output unit 110 are differently modulated according to a pixel pattern of the SLM 120, and the modulated rays are incident onto the object 10.

For example, the SLM 120 may be configured with an array of a plurality of pixels, and modulates an intensity or a phase of a ray according to a pattern in which the plurality of pixels are arranged. The SLM 120 may be a digital micromirror device (DMD). Here, the DMD may be configured with micromirrors that reflect incident rays, and may control a turn-on/off of each of the micromirrors and provide a pixel pattern according to an array of turned-on/off pixels. However, according to one embodiment, the SLM 120 is not limited to the DMD.

The modulation controller 130 controls the SLM 120 in order for the pixel patterns of the SLM 120 to be sequentially applied to the SLM 120. In an exemplary embodiment, the modulation controller 130 may control the SLM 120 in order for the SLM 120 to have uncorrelated pixel patterns.

For example, the modulation controller 130 may determine a pixel pattern to provide a non-correlation between phase modulation of a ray based on a certain pixel pattern and phase modulation of a ray based on another pixel pattern.

According to an exemplary embodiment, the modulation controller 130 may determine a plurality of pixel patterns in order for the pixel patterns to have an orthogonal relation therebetween. According to another exemplary embodiment, the modulation controller 130 may determine a plurality of pixel patterns, based on Hadamard-pattern permutation.

Moreover, the modulation controller 130 may perform spatial shift modulation on some pixel patterns to determine a pixel pattern. The spatial shift modulation denotes an operation that shifts an array of pixels by a certain number in a direction vertical or horizontal to one pixel pattern.

Figure 2:
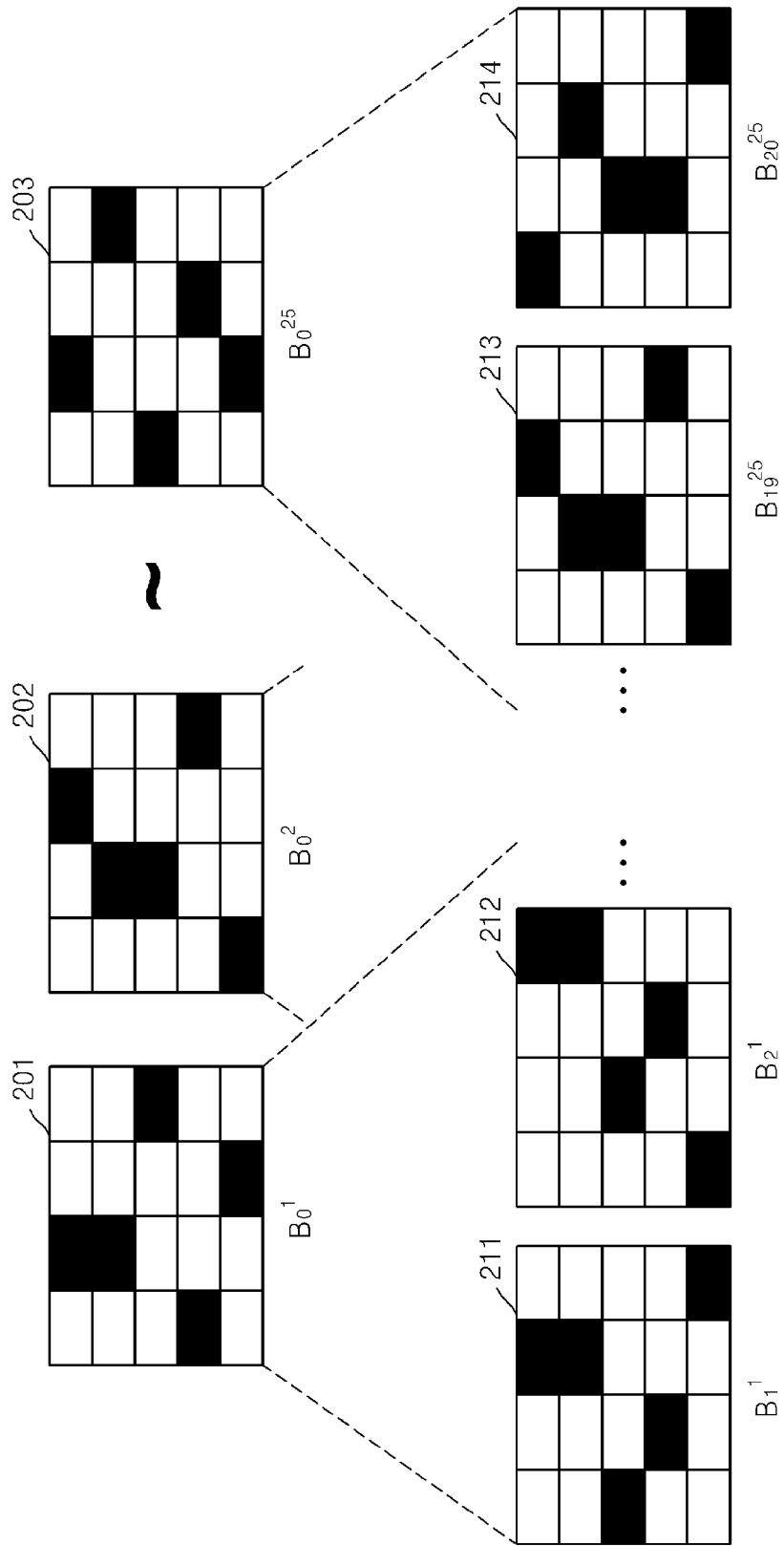
FIG. 2 is a diagram for describing basis patterns and shift patterns of a spatial light modulator according to an exemplary embodiment.

FIG. 2 is a diagram for describing basis patterns and shift patterns of the SLM 120 according to an exemplary embodiment;

Referring to FIG. 2, basis patterns $B_0^1$, $B_0^2$, ... and $B_0^{25}$ 201, 202, ... and 203 and shift patterns $B_1^1$, $B_2^1$, ... $B_{19}^{25}$, and $B_{20}^{25}$ 211, 212, ... 213, and 214 correspond to pixel patterns. Here, the pixel pattern $B_i^j$ (where i≥0, j>1) denotes an i-th shift pattern that is spatial-shift-modulated from a j-th basis pattern. Here, when i=0, this denotes a basis pattern.

In FIG. 2, pixel patterns of five rows, four columns are illustrated. However, the pixel patterns of FIG. 2 are illustrated for convenience of description, and the pixel patterns according to an exemplary embodiment may have various numbers of rows and columns, for example, 1024×768, without being limited thereto. In addition, the number of basis patterns $B_0^1$, $B_0^2$, and $B_0^{25}$ 201, 202, and 203 and the number of shift patterns $B_1^1$, $B_2^1$, $B_{19}^{25}$, and $B_{20}^{25}$ 211, 212, 213, and 214 are arbitrarily illustrated for convenience of description, and exemplary embodiments are not limited thereto.

The basis patterns $B_0^1$, $B_0^2$, and $B_0^{25}$ 201, 202, and 203 denote pixel patterns that are references for spatial shift modulation. Pixel patterns of the basis patterns $B_0^1$, $B_0^2$, and $B_0^{25}$ 201, 202, and 203 have a non-correlation therebetween.

As described above, the shift patterns $B_1^1$, $B_2^1$, $B_{19}^{25}$, and $B_{20}^{25}$ 211, 212, 213, and 214 are pixel patterns that are parallel shifted by a certain number of pixels in a vertical or horizontal direction by being spatial-shift-modulated from the basis patterns $B_0^1$, $B_0^2$, and $B_0^{25}$ 201, 202, and 203.

For example, the shift pattern $B_1^1$ 211 is a pixel pattern that is parallel shifted by one pixel in a right direction from the basis pattern $B_0^1$ 201, and the shift pattern $B_2^1$ 212 is a pixel pattern that is parallel shifted by two pixels in the right direction from the basis pattern $B_0^1$ 201. Also, the shift pattern $B_{19}^{25}$ (213) is a pixel pattern that is parallel shifted by two pixels in a downward direction from the basis pattern $B_0^{25}$ 203, and the shift pattern $B_{20}^{25}$ 214 is a pixel pattern that is parallel shifted by three pixels in the downward direction from the basis pattern $B_0^{25}$ 203.

Referring again to FIG. 1, the modulation controller 130 may control the SLM 120 in order for the SLM 120 to have various types of pixel patterns such as the basis patterns $B_0^1$, $B_0^2$, and $B_0^{25}$ 201, 202, and 203 and shift patterns $B_1^1$, $B_2^1$, $B_{19}^{25}$, and $B_{20}^{25}$ 211, 212, 213, and 214 of FIG. 2.

The depth scanner 140 performs a depth scan operation a plurality of times for each spot of a surface of the object 10 by using the rays reflected from the SLM 120.

In this case, the depth scan operation denotes an operation that transmits the ray, which is reflected from the SLM 120, in a depth direction from one spot of the surface of the object 10, and acquires the ray which returns to the depth scanner 140 by being reflected and scattered by the object 10. Such a depth scan is called A-scan. According to an exemplary embodiment, the depth scanner 140 may perform the depth scan operation by using an optical coherence.

The depth scanner 140 repeats the depth scan operation each time the pixel pattern of the SLM 120 is modulated at the same spot of the surface of the object 10.

The depth scanner 140 may be provided as a separate module from the tomography image generating apparatus 100.

The signal acquirer 150 acquires an interference signal reflected from the object 10 through the depth scan operation of the depth scanner 140. Here, the interference signal denotes a signal that is generated by electrically converting the ray which returns to the depth scanner 140 by being transmitted, reflected, and scattered by the object 10.

For example, the ray returning to the depth scanner 140 may be a ray that is acquired according to interference between a reference ray and a response ray which is acquired from a measurement ray incident onto the object 10. As another example, the ray returning to the depth scanner 140 may be a ray that is acquired according to interference between secondary harmonic signals of the reference ray and response ray.

The signal acquirer 150 acquires interference signals respectively corresponding to the pixel patterns of the SLM 120.

The image generator 160 generates a tomography image by using the interference signal acquired from the signal acquirer 150. That is, the image generator 160 generates the tomography image corresponding to one pixel pattern, by using an interference signal corresponding to the one pixel pattern. An operation of generating the tomography image by using the interference signal is well known to one of ordinary skill in the art, and thus, its detailed description is not provided.

The tomography image generating apparatus 100, for example, may repeat the depth scan operation on each of a plurality of pixel patterns to acquire a tomography image and an interference signal which correspond to each of the pixel patterns.

First, the modulation controller 130 controls the SLM 120 in order for the SLM 120 to have the basis pattern $B_0^1$. Then, the depth scanner 140 performs the depth scan operation by using the ray obtained through modulation by the SLM 120, and the signal acquirer 150 acquires an interference signal. The image generator 160 generates a tomography image corresponding to the basis pattern $B_0^1$ by using the acquired interference signal.

Subsequently, the modulation controller 130 controls the SLM 120 in order for the SLM 120 to have the basis pattern $B_0^2$. Then, the depth scanner 140 performs the depth scan operation by using the ray obtained through modulation by the SLM 120, and the signal acquirer 150 acquires an interference signal. The image generator 160 generates a tomography image corresponding to the basis pattern $B_0^2$ by using the acquired interference signal.

As described above, the tomography image generating apparatus 100 may perform the depth scan operation a plurality of times at one spot of the surface of the object 10 by using different pixel patterns of the SLM 120, thereby generating a plurality of tomography images respectively corresponding to the different pixel patterns. Here, an order among pixel patterns for which the depth scan operation is performed is not limited, and may be variously changed.

The pattern determiner 170 may repeatedly determine a desired (e.g., optimal) pixel pattern of the SLM 120 by using the plurality of tomography images which are generated by repeatedly performing the depth scan operation at one spot of the surface of the object 10 and determines a final optimal pixel pattern when the depth scan operation for all the pixel patterns is completed.

When the depth scan operation performed for all the pixel patterns at one spot of the surface of the object 10 is ended, the modulation controller 130 controls the SLM 120 in order for the SLM 120 to have the final optimal pixel pattern that is determined by the pattern determiner 170.

The depth scanner 140 again performs the depth scan operation using the final optimal pixel pattern, and the signal acquirer 150 acquires an interference signal corresponding to the optimal pixel pattern. In addition, the image generator 160 generates an optimal tomography image corresponding to the final optimal pixel pattern by using the acquired interference signal.

The generated optimal tomography image corresponds to a tomography image that is generated from one spot of the surface of the object 10. That is, the above-described operations of the tomography image generating apparatus 100 are operations performed at one spot of the surface of the object 10.

The tomography image generating apparatus 100 may repeatedly perform the above-described operations on the other spots of the surface of the object 10 and acquire a tomography image based thereon. As a result, the tomography image generating apparatus 100 generates a plurality of final tomography images respectively corresponding to spots of the surface of the object 10.

The tomography image generating apparatus 100 may match the generated final tomography images to output at least one two-dimensional (2D) or three-dimensional (3D) tomography image of the inside of the object 100.

Figure 3:
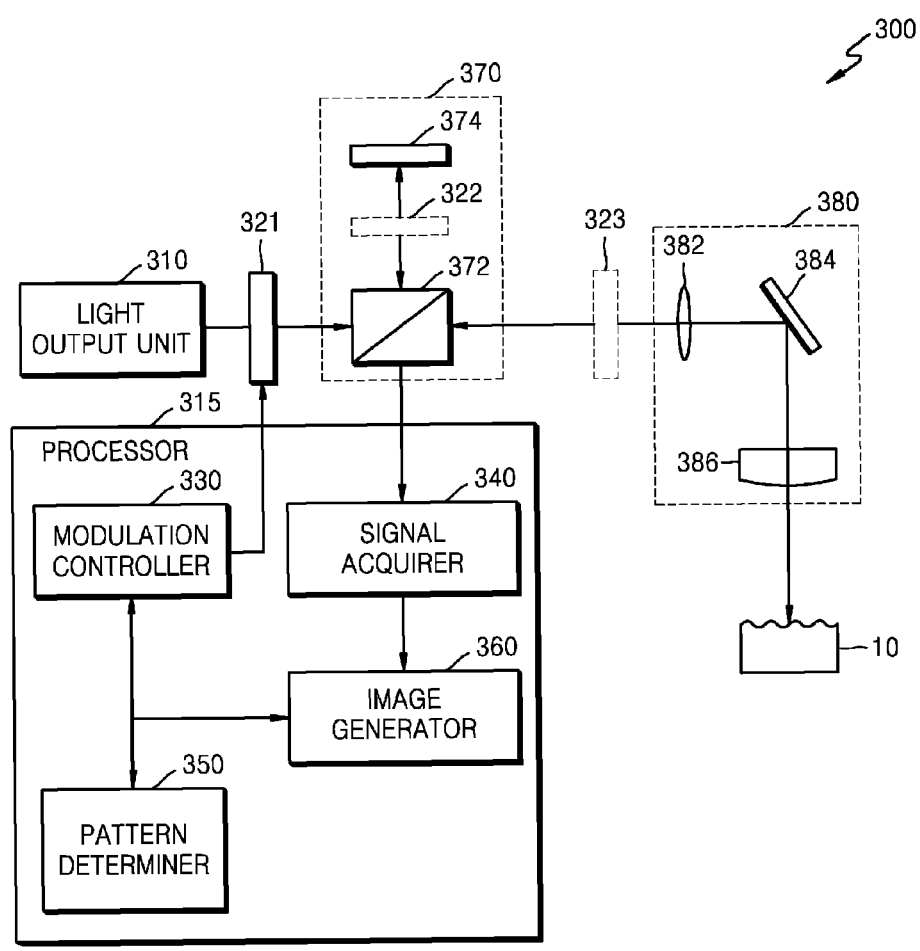
FIG. 3 is a diagram illustrating an optical coherence tomography (OCT) apparatus to which the tomography image generating apparatus of FIG. 1 is applied.

FIG. 3 is a diagram illustrating an OCT apparatus 300 to which the tomography image generating apparatus 100 of FIG. 1 is applied.

Referring to FIG. 3, the OCT apparatus 300 includes a light output unit 310, an SLM 321, a modulation controller 330, a signal acquirer 340, a pattern determiner 350, an image generator 360, an interferometer 370, and an optical probe 380. The same descriptions of the light output unit 110, the SLM 120, the modulation controller 130, the depth scanner 140, the signal acquirer 150, the image generator 160, and the pattern determiner 170 provided with reference to FIG. 1 may apply to the light output unit 310, the SLM 321, modulation controller 330, the signal acquirer 340, the pattern determiner 350, the image generator 360, the interferometer 370, and the optical probe 380 of FIG. 3, and thus, repetitive descriptions thereof are not provided. However, it can be understood by one of ordinary skill in the art that although not described below, the same descriptions of the tomography image generating apparatus 100 of FIG. 1 may apply to the OCT apparatus 300 of FIG. 3.

The OCT apparatus 300 of FIG. 3 is illustrated as including the above elements associated with an exemplary embodiment, for preventing the feature of the present exemplary embodiment from being obscured. However, it can be understood by those skilled in the art that the OCT apparatus 300 may further include general-use elements in addition to the elements of FIG. 3.

In FIG. 3, the modulation controller 330, the signal acquirer 340, the pattern determiner 350, and the image generator 360 may be included in a processor 315. Here, the processor 315 may include at least one processor module. The processor 315 may include a processor, a microprocessor, a central processing unit (CPU), or an integrated circuit for executing programmable instructions stored in a storage, e.g., a memory.

The light output unit 310 outputs rays. Here, the rays output from the light output unit 310 may be wavelength-swept light or laser, but are not limited thereto.

The light output unit 310 transfers output rays to the interferometer 370. According to an exemplary embodiment, the SLM 321 may be provided between the light output unit 310 and the interferometer 370. Therefore, the ray of which a phase is modulated by the SLM 321 may be transferred to the interferometer 370.

The SLM 321 modulates a phase of the ray according to a pattern in which a plurality of pixels are arranged. The SLM 321 of the OCT apparatus 300 may modulate a phase of at least one from among a ray, a measurement ray, or a reference ray which is emitted from the light output unit 310.

Referring to FIG. 3, the SLM 321 of the OCT apparatus 300 may be positioned between the light output unit 310 and the interferometer 370, or may be positioned at a second position 322 or a third position 323.

That is, the SLM 321 may be positioned between the light output unit 310 and the interferometer 370, or positioned between a reference mirror 374 and a beam splitter 372 of the interferometer 370, or positioned at a side of the optical probe 380 onto which the measurement ray obtained through split by the beam splitter 372 is incident.

The modulation controller 330 controls the SLM 321 in order for the SLM 321 to have a pixel pattern such as the above-described basis pattern or shift pattern.

The interferometer 370 splits the rays, output from the light output unit 310, into the measurement ray and the reference ray. The interferometer 370 irradiates the measurement ray onto the object 10, and receives a response ray obtained from the measurement ray reflected by the object 10.

The signal acquirer 340 acquires an interference signal generated from the response ray and the reference ray. In this case, the signal acquirer 340 acquires the interference signal corresponding to each pixel pattern. The signal acquirer 340 transfers the acquired interference signal to the image generator 360.

The image generator 360 generates a plurality of tomography images respectively corresponding to the pixel patterns by using the interference signal.

The pattern determiner 350 repeatedly determines an optimal pixel pattern of the SLM 321 by using the plurality of tomography images which are generated by repeatedly performing the depth scan operation at one spot of the surface of the object 10, thereby determining a final optimal pixel pattern.

The interferometer 370 may include the beam splitter 372 and the reference mirror 374. The rays transferred from the light output unit 310 are split into the measurement ray and the reference ray by the beam splitter 372. Among the rays obtained through split by the beam splitter 372, the measurement ray is transferred to the optical probe 380, and the reference ray is transferred to and reflected by a reference mirror 384 to return to a beam splitter 382.

The measurement ray transferred to the optical probe 380 is irradiated onto the object 10 of which an internal tomography image is to be captured by the optical probe 380, and the response ray obtained from the measurement ray reflected by the object 10 is transferred to the beam splitter 372 of the interferometer 370 through the optical probe 380. The transferred response ray and the reference ray reflected by the reference mirror 374 causes interference to the beam splitter 372.

The optical probe 380 may include a collimator lens 382, a galvano scanner 384, and a lens 386.

Here, the galvano scanner 384 is a mirror that rotates in a certain radius about a certain axis, and may be implemented with a micro electro mechanical system (MEMS) scanner that obtains a driving force for rotation from the MEMS.

The galvano scanner 384 is fixed while the depth scan operation is repeatedly performed on one spot of the surface of the object 10. When the galvano scanner 384 rotates at a certain angle, the depth scan operation may be performed on the other spots of the surface of the object 10.

The measurement light transferred from the interferometer 370 passes through the collimator lens 382 of the optical probe 380 to be collimated. The collimated measurement light is reflected by the galvano scanner 384, and thus, a traveling direction of the measurement light is adjusted. The direction-adjusted measurement light passes through the lens 386, and is irradiated onto the object 10.

Therefore, the OCT apparatus 300 according to an exemplary embodiment may determine the optimal pixel pattern, used to acquire a clearer tomography image, among a plurality of shift patterns of the basis pattern acquired by performing spatial shift modulation, and generate the optical tomography image based on the optimal pixel pattern in which an amount of phase modulation suitable for a material characteristic of the object 10 is reflected.

In the related art, in generating a tomography image with a DMD, a depth scan operation, an interference signal acquiring operation, a tomography image generating operation, and an optimal pattern determining operation are repeatedly performed at every depth scan period to determine an optimal pixel pattern of the DMD. However, when a plurality of kinds of pixel patterns exist to be adjusted by the DMD, a final tomography image may not be generated until all of operations including the depth scan operation to the optimal pattern determining operation are performed for all pixel patterns. For this reason, a related art method of generating a tomography image has a slower process speed.

Hereinafter, an operation and a function of the tomography image generating apparatus 100 of FIG. 1 or the OCT apparatus 300 of FIG. 3 for generating a tomography image of the object 10 at a higher speed according to exemplary embodiments are described.

Figure 4:
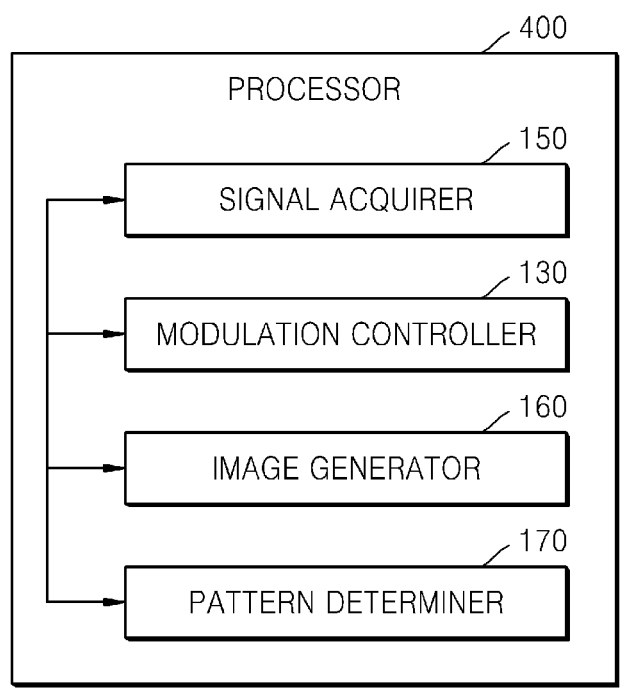
FIG. 4 is a diagram illustrating a configuration of a processor included in the tomography image generating apparatus of FIG. 1 or the OCT apparatus of FIG. 3, according to an exemplary embodiment.

FIG. 4 is a diagram illustrating a configuration of a processor 400 included in the tomography image generating apparatus 100 of FIG. 1 or the OCT apparatus 300 of FIG. 3, according to an exemplary embodiment. That is, the processor 400 of FIG. 4 may correspond to the processor 135 of FIG. 1 or the processor 315 of FIG. 3.

Referring to FIG. 4, for example, the processor 400 may include a graphics processing unit (GPU) that executes a parallel arithmetic algorithm implemented by compute unified device architecture (CUDA) coding, or include a field programmable gate array (FPGA) that executes a parallel arithmetic algorithm implemented by VHSIC hardware description language (VHDL) coding. However, exemplary embodiments are not limited thereto.

The processor 400 may be implemented with at least one processor module. The processor 400 may be implemented as an array of a plurality of logic gates, or may be implemented as a combination of a general-use microprocessor and a memory that stores a program executable by the microprocessor. Also, the processor 400 may be implemented as an application program module. That is, the processor 400 is not limited to one type.

The processor 400 may include a signal acquirer 150, a modulation controller 130, an image generator 160, and a pattern determiner 170. The signal acquirer 150, the modulation controller 130, the image generator 160, and the pattern determiner 170 may respectively correspond to the elements included in the tomography image generating apparatus 100 of FIG. 1, or may respectively correspond to the signal acquirer 340, the modulation controller 330, the image generator 360, and the pattern determiner 350 which are included in the OCT apparatus 300 of FIG. 3.

At least one of the signal acquirer 150, the modulation controller 130, the image generator 160, and the pattern determiner 170 may be implemented as an independent processor module in the processor 400. Alternatively, all or a portion of the signal acquirer 150, the modulation controller 130, the image generator 160, and the pattern determiner 170 may be implemented as one processor module.

According to an exemplary embodiment, the signal acquirer 150, the modulation controller 130, the image generator 160, and the pattern determiner 170 may be elements capable of executing a parallel arithmetic operation in the processor 400, respectively.

The modulation controller 130 controls the pixel patterns of the SLM 120. Here, as described above, each of the pixel patterns may correspond to one of the basis patterns and the shift patterns.

The signal acquirer 150 acquires interference signals each time the depth scan operation is performed on one spot of the surface of the object 10. The interference signals acquired by the signal acquirer 150 may respectively correspond to the pixel patterns of the SLM 120.

Whenever the depth scan operation for the object 10 is performed at least one time, the image generator 160 generates a candidate tomography image by using the interference signal acquired by the performed depth scan operation.

The pattern determiner 170 repeatedly determines the optimal pixel pattern used to acquire a clearer tomography image of the object 10, by using the generated candidate tomography image.

According to an exemplary embodiment, control of the pixel pattern by the modulation controller 130 and acquisition of the interference signal by the signal acquirer 150 may correspond to a first thread, generation of the candidate tomography image by the image generator 160 may correspond to a second thread, and determination (or updating) of the optimal pixel pattern by the pattern determiner 170 may correspond to a third thread. Here, the first thread may correspond to a thread for performing the depth scan operation.

The processor 400 may parallel process the first to third threads.

Operations of the signal acquirer 150, the modulation controller 130, the image generator 160, and the pattern determiner 170 will be described in detail with reference to FIGS. 5 and 6.

Figure 5:
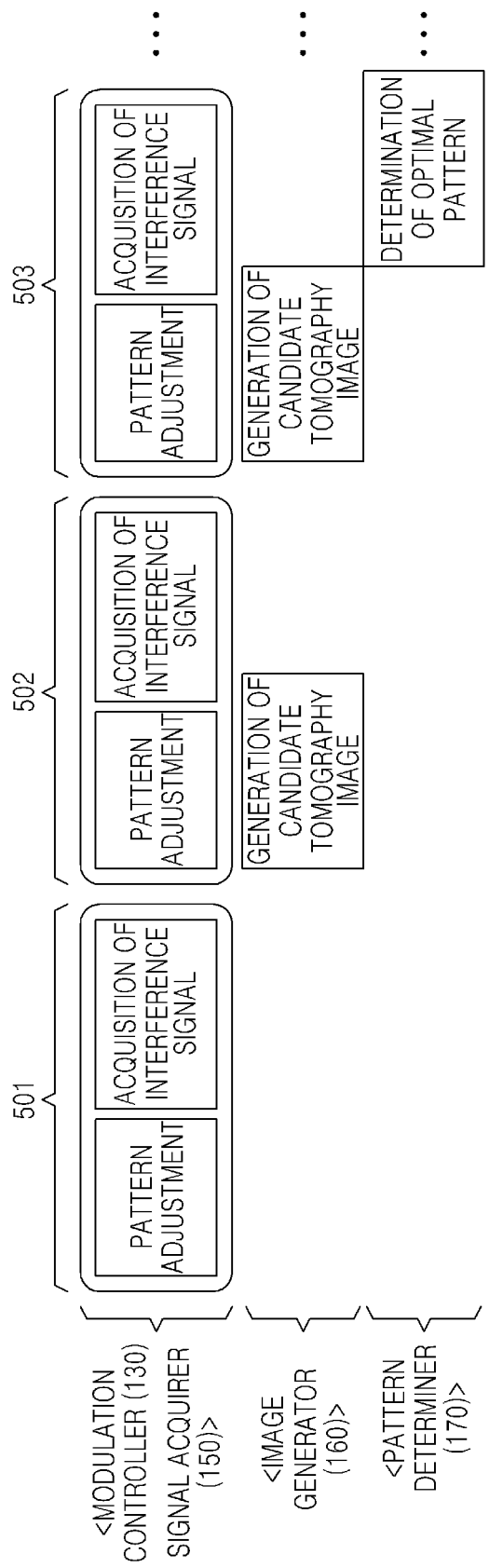
FIG. 5 is a diagram for describing operation timings of a signal acquirer, a modulation controller, an image generator, and a pattern determiner according to an exemplary embodiment.

FIG. 5 is a diagram for describing operation timings of the signal acquirer 150, the modulation controller 130, the image generator 160, and the pattern determiner 170 according to an exemplary embodiment.

Referring to FIG. 5, in a first period 501, a first pixel pattern of the SLM 120 is adjusted by the modulation controller 130, and a first interference signal is acquired by the signal acquirer 150. That is, during the first period 501, a first depth scan operation is completed.

In a second period 502, a second pixel pattern of the SLM 120 is adjusted by the modulation controller 130, and a second interference signal is acquired by the signal acquirer 150. That is, during the second period 502, a second depth scan operation is completed.

In the second period 502, the second depth scan operation is performed, and simultaneously, the image generator 160 generates a first candidate tomography image by using the first interference signal that has been acquired during the first period 501. That is, the second depth scan operation and generation of the first candidate tomography image by the image generator 160 are parallel performed in the processor 400.

In a third period 503, a third pixel pattern of the SLM 120 is adjusted by the modulation controller 130, and a third interference signal is acquired by the signal acquirer 150. That is, during the third period 503, a third depth scan operation is completed.

In the third period 503, the third depth scan operation is performed, and simultaneously, the image generator 160 generates a second candidate tomography image by using the second interference signal that has been acquired during the second period 502. That is, the third depth scan operation and generation of the second candidate tomography image by the image generator 160 are parallel performed in the processor 400.

When the second candidate tomography image is generated in the third period 503, the pattern determiner 170 determines a first optimal pixel pattern by using the first and second candidate tomography images. That is, the third depth scan operation, generation of the second candidate tomography image, and determination of the first optimal pixel pattern are parallel performed in the processor 400.

After the third period 503, similarly, the modulation controller 130 and the signal acquirer 150 may repeatedly perform the depth scan operation. Furthermore, in parallel with the performing of the depth scan operation, the image generator 160 may generate a candidate tomography image by using the interference signal that has been acquired by a previous depth scan operation. In addition, the pattern determiner 170 may repeatedly determine the optimal pixel pattern by using the candidate tomography image that has been generated in a previous period.

The first to third periods 501 to 503 may be continuously repeated until depth scan operations using all the pixel patterns (i.e., all the basis patterns and the shift patterns) are performed with respect to a first spot of the surface of the object 10.

When the depth scan operations using all the pixel patterns are performed at the first spot, the modulation controller 130 controls the SLM 120 in order for the SLM 120 to have the final optimal pixel pattern that is determined by the pattern determiner 170. The signal acquirer 150 acquires an interference signal corresponding to the determined final optimal pixel pattern. That is, the depth scan operation is again performed once at the first spot by using the final optimal pixel pattern.

The image generator 160 generates a final tomography image corresponding to the final optimal pixel pattern.

The above-described operations respectively correspond to operations that are performed at the first spot. The tomography image generating apparatus 100 of FIG. 1 or the OCT apparatus 300 of FIG. 3 may repeatedly perform the above-described operations at a second spot, a third spot, etc., to generate final tomography images respectively corresponding to the spots.

The tomography image generating apparatus 100 of FIG. 1 or the OCT apparatus 300 of FIG. 3 may match the generated final tomography images to output at least one 2D or 3D tomography image of the inside of the object 100.

In the related art, as described above, a series of operations that generate an image and determine the optimal pixel pattern are repeatedly performed after the depth scan operation is performed. In this case, a next depth scan operation cannot be performed until the series of operations are performed, and therefore, a processing speed is slower in the related art.

On the other hand, according to exemplary embodiments, the signal acquirer 150, the modulation controller 130, the image generator 160, and the pattern determiner 170 of the tomography image generating apparatus 100 of FIG. 1 parallel process data, and thus generate a final tomography image at a higher speed than the related art.

Figure 6:
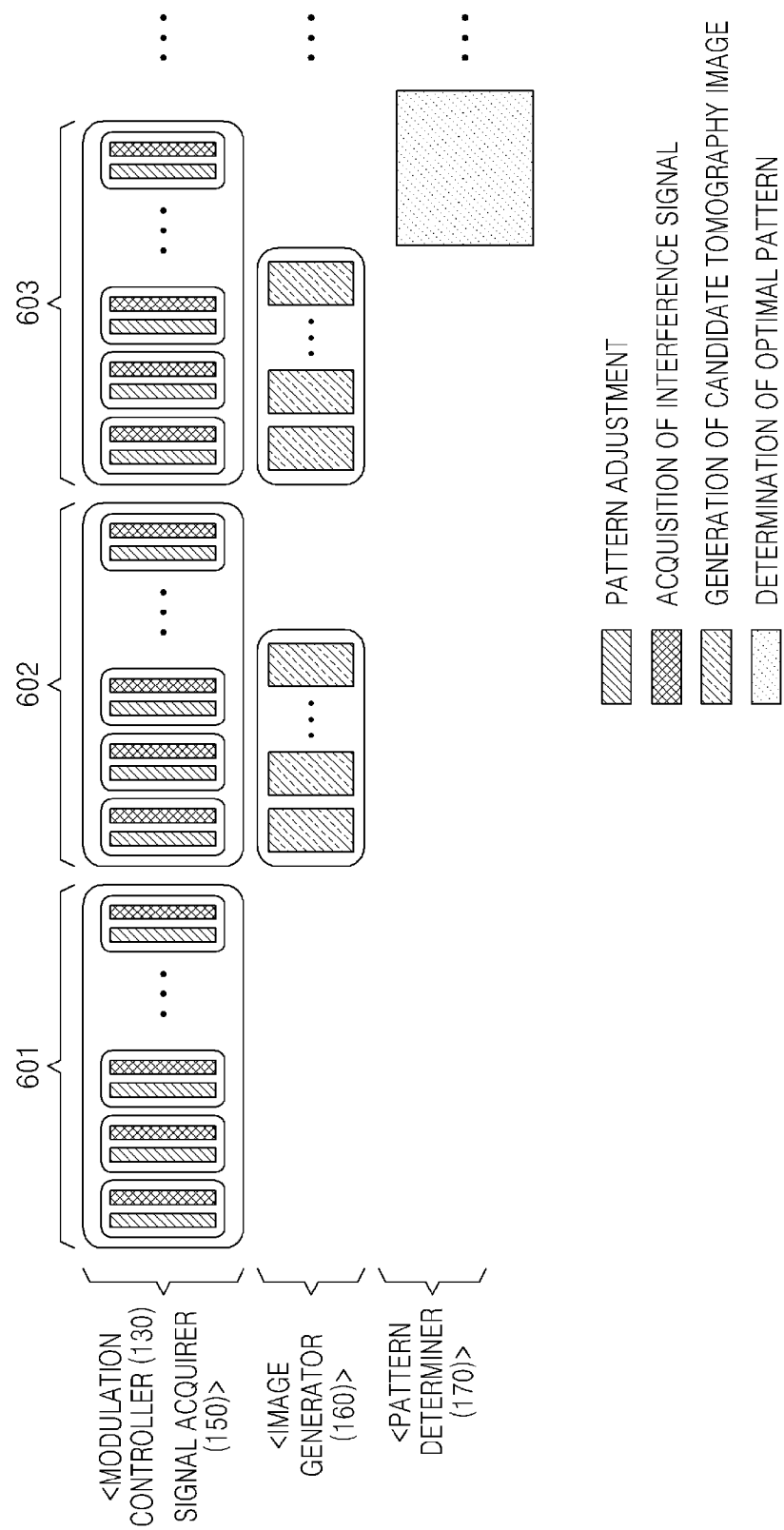
FIG. 6 is a diagram for describing operation timings of a signal acquirer, a modulation controller, an image generator, and a pattern determiner according to another exemplary embodiment.

FIG. 6 is a diagram for describing operation timings of the signal acquirer 150, the modulation controller 130, the image generator 160, and the pattern determiner 170 according to another exemplary embodiment.

In FIG. 5, it has been described above that each time a depth scan operation is performed, a tomography image is generated by using an interference signal acquired by a previous depth scan operation.

However, referring to FIG. 6, when a depth scan operation is performed a certain number of times, a plurality of tomography images are generated at one time by using interference signals that are acquired by the certain number of performed depth scan operations.

For example, it is assumed that a depth scan operation is repeatedly performed n number of times in a first period 601.

Subsequently, the depth scan operation is repeatedly performed n number of times in a second period 602. Also, during the second period 602, n number of candidate tomography images are parallel generated from n number of interference signals that have been acquired in the first period 601.

Subsequently, the depth scan operation is repeatedly performed n number of times in a third period 603. Also, during the third period 603, n number of candidate tomography images are parallel generated from n number of interference signals that have been acquired in the second period 602. Also, when generation of the n candidate tomography images is performed in the third period 603, the optimal pixel pattern is determined by using the n candidate tomography images generated in the first period 601 and the n candidate tomography images generated in the second period 602.

According to FIGS. 5 and 6, the number of times the depth scan operation is performed in each period is not limited. In addition, the depth scan operation may be performed different times in respective periods. That is, according to an exemplary embodiment, the number of times the depth scan operation is performed in each period may be variously changed.

Hereinafter, a method in which the pattern determiner 170 determines the optimal pixel pattern will be described.

Figure 7:
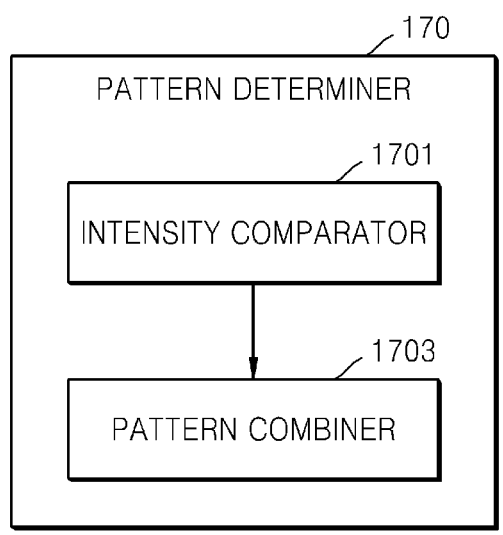
FIG. 7 is a detailed block diagram of a pattern determiner according to an exemplary embodiment.

FIG. 7 is a detailed block diagram of the pattern determiner 170 according to an exemplary embodiment.

Referring to FIG. 7, the pattern determiner 170 may be included in the tomography image generating apparatus 100 of FIG. 1 or the OCT apparatus 300 of FIG. 3. The pattern determiner 170 includes an intensity comparator 1701 and a pattern combiner 1703.

The pattern determiner 170 compares intensities of pixels corresponding to a region of interest (ROI) of the object 10 in one or more candidate tomography images to determine the optimal pixel pattern.

For example, the intensity comparator 1701 of the pattern determiner 170 compares intensities of units corresponding to substantially the same depth within a depth range corresponding to the ROI.

The pattern combiner 1703 of the pattern determiner 170 combines pixel patterns respectively corresponding to candidate tomography images including a pixel having a greatest intensity for each depth, according to the comparison result of the intensity comparator 1701. Here, combination of the pixel patterns may denote summation or weighted summation of the pixel patterns.

Therefore, the pattern determiner 170 may determine the optimal pixel pattern by using the combined pixel patterns.

The intensity comparator 1701 and the pattern combiner 1703 may perform an operation of comparing intensities and an operation of combining pixel patterns in units of a certain number of pixel patterns.

Figure 8A:
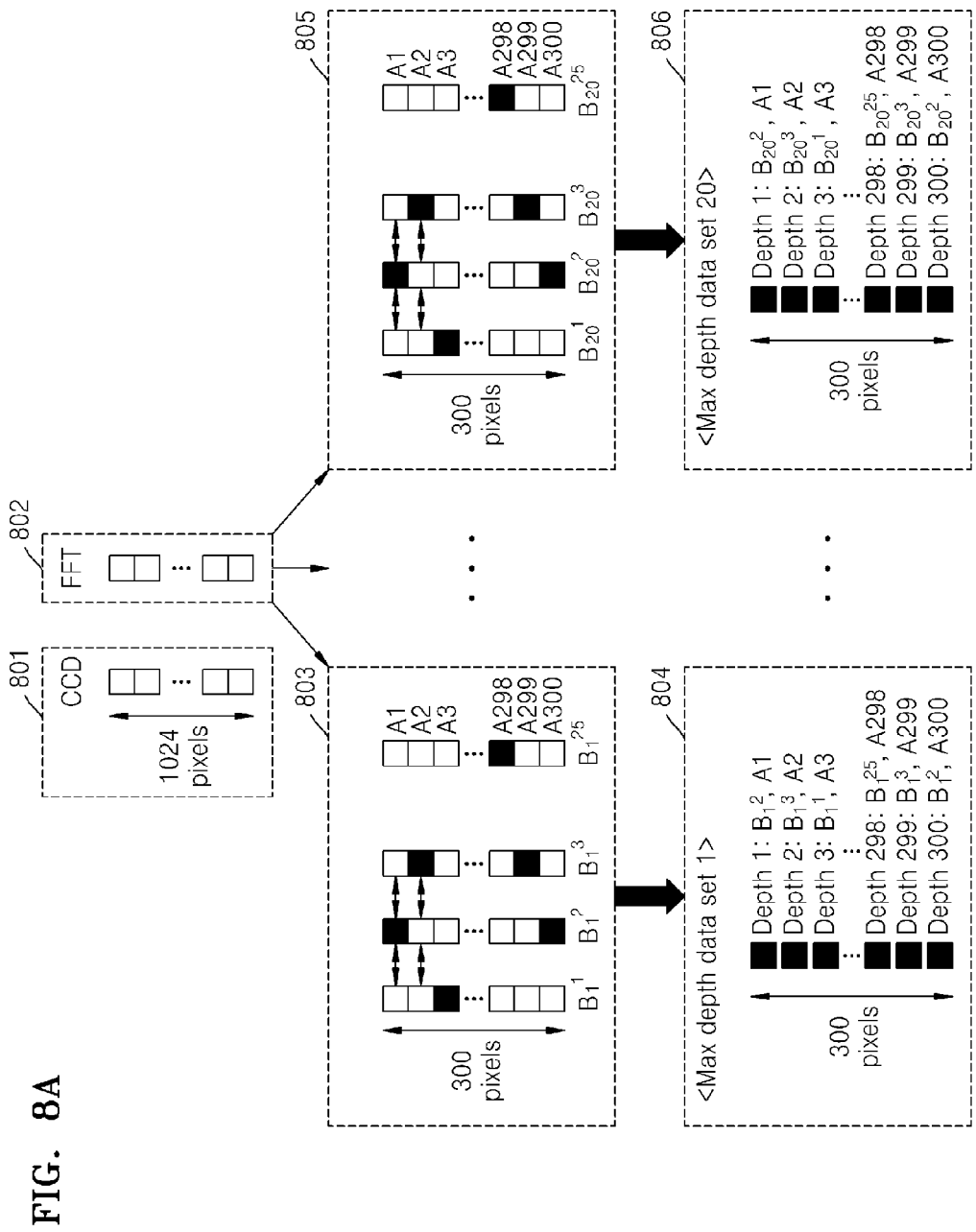
FIGS. 8A and 8B are diagrams for describing an operation in which a pattern determiner determines an optimal pixel pattern according to an exemplary embodiment.
Figure 8B:
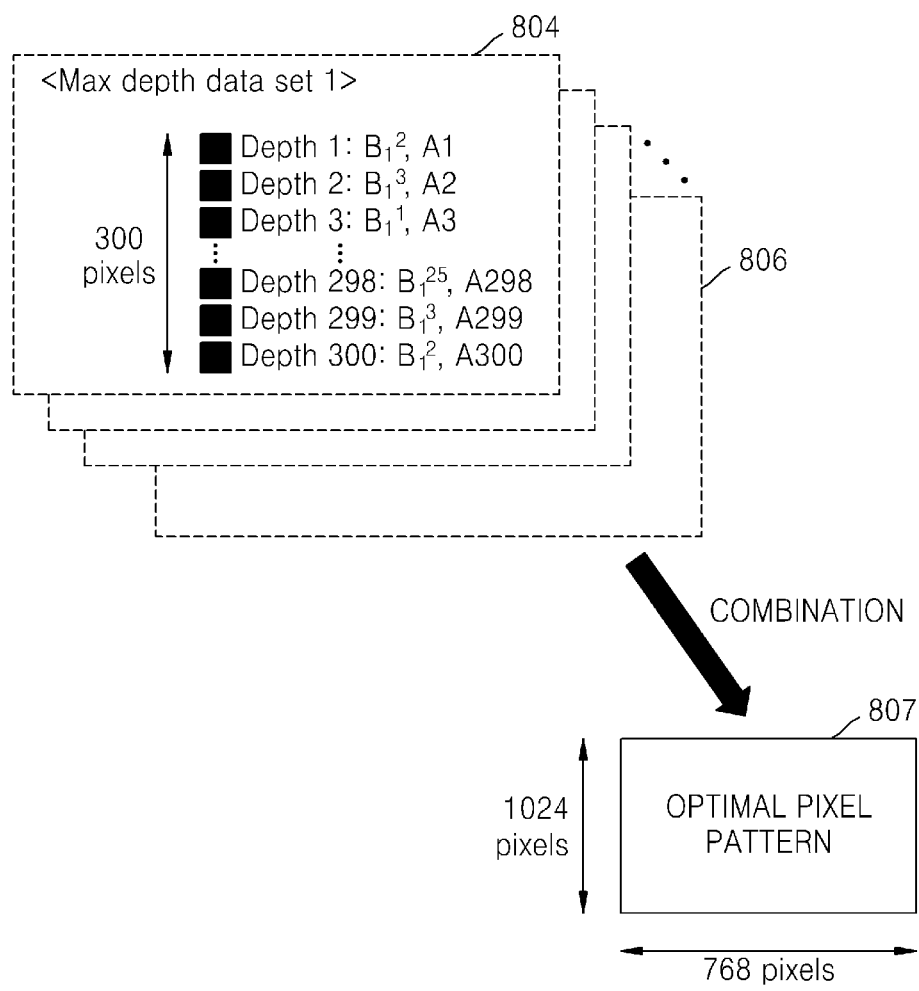

FIGS. 8A and 8B are diagrams for describing an operation in which the pattern determiner 170 determines the optimal pixel pattern according to an exemplary embodiment.

Referring to FIGS. 8A and 8B, the optimal pixel pattern determining operation according to an exemplary embodiment may be an operation which is performed in the tomography image generating apparatus 100 of FIG. 1 or the OCT apparatus 300 of FIG. 3. Therefore, although not described below, the same descriptions of the tomography image generating apparatus 100 of FIG. 1 or the OCT apparatus 300 of FIG. 3 may apply to the optimal pixel pattern determining operation according to an exemplary embodiment.

The operation of FIGS. 8A and 8B denotes an operation which is performed at one spot of the surface of the object 10. According to an exemplary embodiment, the optimal pixel pattern determining operation may be repeatedly performed at the other spots of the surface of the object 10.

The depth scanner 140 (for example, the optical probe 380) may include a charge coupled device (CCD).

In operation 801, the depth scanner 140 acquires interference signals having a resolution of 1024 pixels by using 500 pixel patterns $B_0^1$ to $B_{20}^{25}$. However, the resolution of the interference signals may be variously changed.

In operation 802, the image generator 160 performs a fast Fourier transform (FFT) and a filtering operation on the acquired interference signals to convert the interference signals into candidate tomography images.

In operation 803, the pattern determiner 170 compares pixels of candidate tomography images respectively corresponding to 25 pixel patterns $B_1^1$ to $B_1^{25}$. Here, the compared pixels are pixels within a depth range of an ROI. In FIGS. 8A and 8B, the depth range is assumed as 300 pixels, but exemplary embodiments are not limited thereto. Also, in FIGS. 8A and 8B, the pixels are compared in units of 25 pixel patterns, but exemplary embodiments are not limited thereto and may be variously changed.

For example, the pattern determiner 170 compares pixels corresponding to Depth 1 (or row A1) to determine a pixel pattern corresponding to a candidate tomography image including a pixel having a greatest intensity. According to FIG. 8A, a pixel pattern $B_1^2$ is determined as having the greatest intensity in Depth 1 (or row A1).

Moreover, the pattern determiner 170 compares pixels corresponding to Depth 2 (or row A2) to determine a pixel pattern corresponding to a candidate tomography image including a pixel having the greatest intensity. According to FIG. 8A, a pixel pattern $B_1^3$ is determined as having the greatest intensity in Depth 2 (or row A2).

In operation 804, the pattern determiner 170 generates, by depth, data (i.e. max depth data set 1) of pixel patterns having the greatest intensity by using the pixel patterns which are determined in operation 803. According to the generated data, for example, the pixel pattern $B_1^2$ may be determined in Depth 1, the pixel pattern $B_1^3$ is determined in Depth 2, a pixel pattern $B_1^1$ is determined in Depth 3, a pixel pattern $B_1^{25}$ is determined in Depth 298, the pixel pattern $B_1^3$ is determined in Depth 299, and the pixel pattern $B_1^2$ is determined in Depth 300.

Operations 803 and 804 may be performed on candidate tomography images respectively corresponding to various kinds of pixel patterns $B_2^1$ to $B_{20}^{25}$.

Operations 805 and 806 are operations that compare pixels of candidate tomography images respectively corresponding to last 25 pixel patterns $B_{20}^1$ to $B_{20}^{25}$, and may be performed similar to the above-described operations 803 and 804.

Referring to FIG. 8B, when operations 801 to 806 described above with reference to FIG. 8A are performed, the pattern determiner 170 combines, by depth, data (i.e., max depth data set 1 to max depth data set 20) 804 to 806 of pixel patterns having the greatest intensity to generate the optimal pixel pattern 807.

Figure 9:
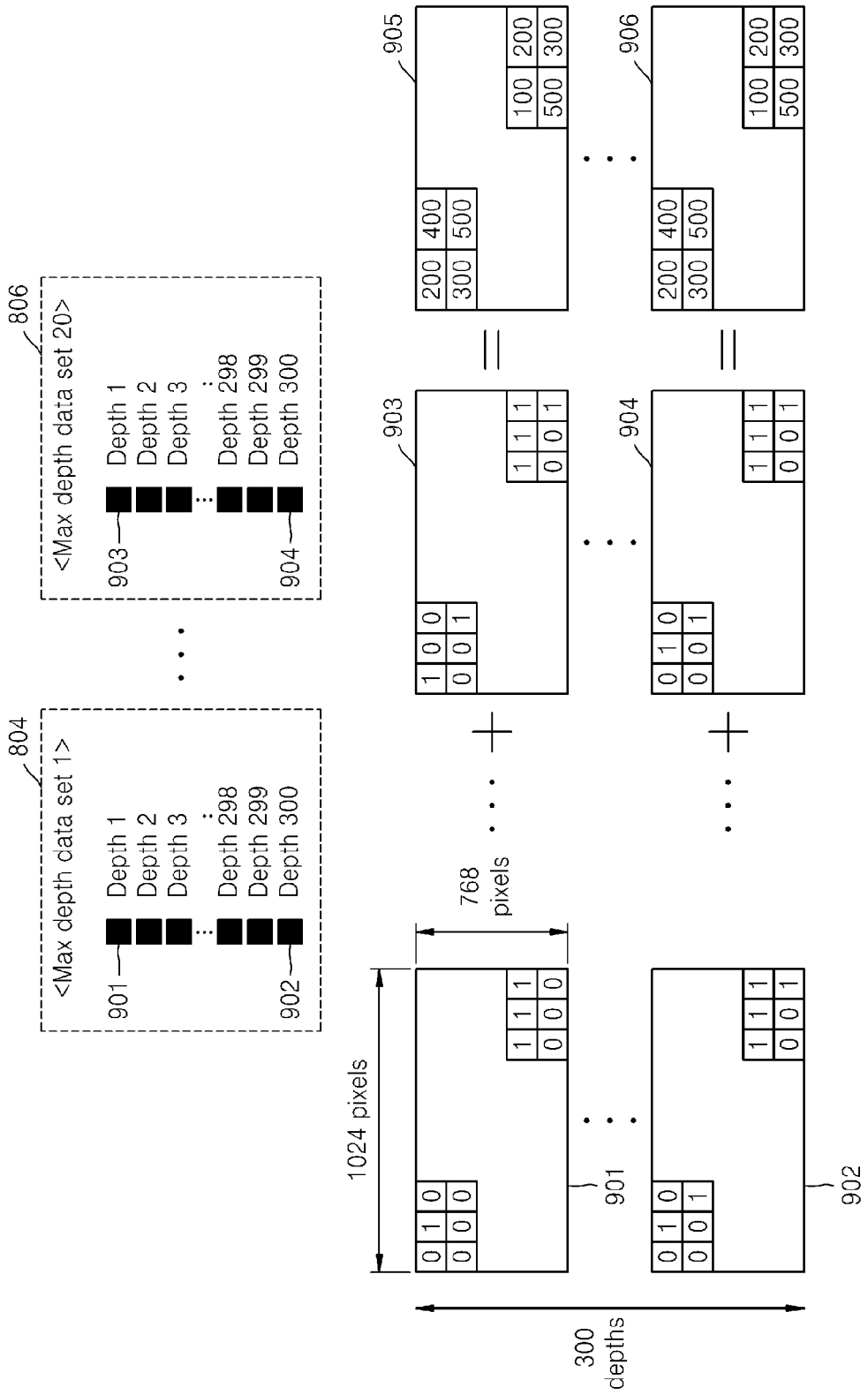
FIG. 9 is a diagram for describing an operation of combining a plurality of pixel patterns to determine an optimal pixel pattern, according to an exemplary embodiment.

FIG. 9 is a diagram for describing an operation of combining a plurality of pixel patterns to determine the optimal pixel pattern, according to an exemplary embodiment.

Referring to FIG. 9, the pattern determiner 170 combines the data (i.e., max depth data set 1 to max depth data set 20) 804 to 806 which are generated in operations 804 to 806 of FIG. 8A to determine optimal pixel patterns 905 and 906.

For example, the data (i.e., max depth data set 1) 804 includes information about pixel patterns corresponding to the greatest intensity in Depth 1 to Depth 300 by comparing pixels of candidate tomography images in operation 803 in FIG. 8A. For example, a pixel pattern 901 may be determined in Depth 1, and a pixel pattern 902 may be determined in Depth 300.

The data (i.e., max depth data set 2) 806 includes the information about the pixel patterns corresponding to the greatest intensity in Depth 1 to Depth 300 by comparing pixels of candidate tomography images in operation 805 in FIG. 8A. For example, a pixel pattern 903 may be determined in Depth 1, and a pixel pattern 904 may be determined in Depth 300.

The pattern determiner 170 combines pixel patterns by depth, in the data (i.e., max depth data set 1 to max depth data set 20) 804 to 806 which are generated in operations 804 to 806 of FIG. 8A.

For example, the pattern determiner 170 combines a pixel pattern 901 of the data (i.e., max depth data set 1) 804 to a pixel pattern 903 of the data (i.e., max depth data set 20) 806 to determine a pixel pattern 905 of Depth 1. Also, the pattern determiner 170 combines a pixel pattern 903 of the data (i.e., max depth data set 1) 804 to a pixel pattern 904 of the data (i.e., max depth data set 20) 806 to determine a pixel pattern 906 of Depth 300.

That is, the pattern determiner 170 determines the optimal pixel pattern as including the combined pixel pattern 905 of Depth 1 to the combined pixel pattern 906 of Depth 300.

A size (i.e., 1024×768) of a pixel pattern illustrated in FIG. 9 and a depth range (i.e., 300 pixels) of an ROI are given for illustrative purposes and may be variously changed.

Figure 10:
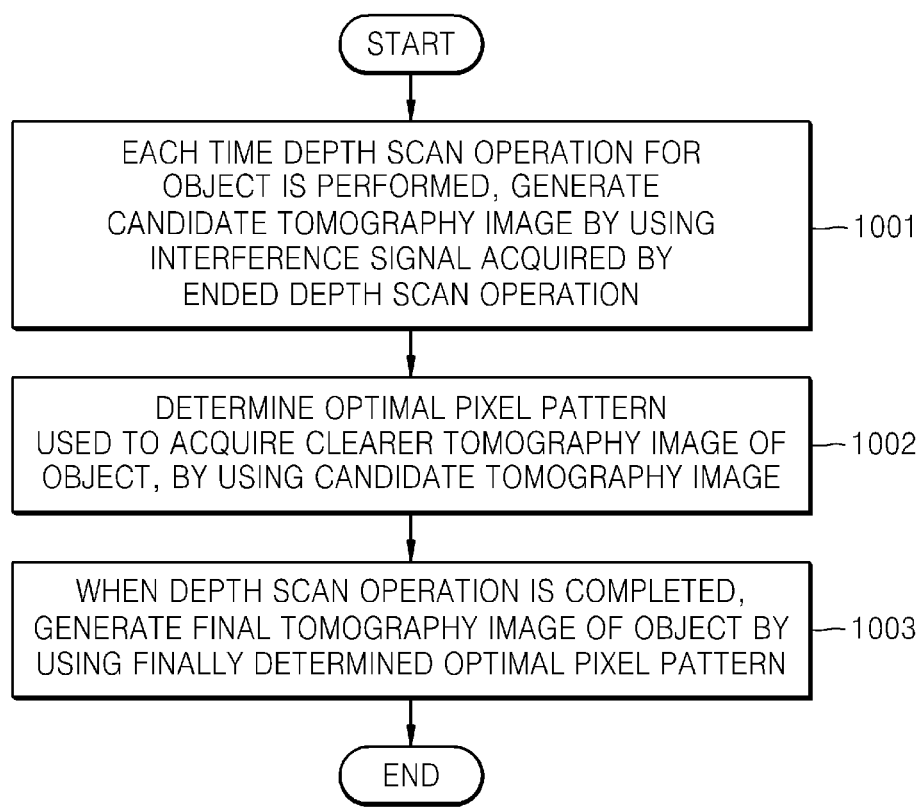
FIG. 10 is a flowchart of a tomography image generating method according to an exemplary embodiment.

FIG. 10 is a flowchart of a tomography image generating method according to an exemplary embodiment. Referring to FIG. 10, the tomography image generating method according to an exemplary embodiment may be performed in the tomography image generating apparatus 100 of FIG. 1 or the OCT apparatus 300 of FIG. 3. Therefore, although not described below, the same descriptions of the tomography image generating apparatus 100 of FIG. 1 or the OCT apparatus 300 of FIG. 3 may apply to the tomography image generating method according to an exemplary embodiment.

In operation 1001, when the depth scan operation for the object 10 is performed each time, the image generator 160 generates a candidate tomography image by using the interference signal acquired by the performed depth scan operation. Here, the depth scan operation may be performed a plural times on the object (e.g., a spot at a surface of the object).

In operation 1002, the pattern determiner 170 determines the optimal pixel pattern used to acquire a clearer tomography image of the object 10, by using the generated candidate tomography image.

In operation 1003, when the depth scan operation is completed, the image generator 160 generates a final tomography image of the object 10 by using the finally determined optimal pixel pattern.

The operation of FIG. 10 denotes an operation which is performed at one spot of the surface of the object 10. According to an exemplary embodiment, the tomography image generating method may be repeatedly performed at the other spots of the surface of the object 10.

As described above, according to exemplary embodiments, by parallel performing a plurality of processing operations of generating a tomography image, a tomography image of an object may be generated at a higher speed.

Methods according to exemplary embodiments may be written as computer programs and be implemented in general-use digital computers that execute the programs using a computer-readable recording medium. A data structure used in the above-described exemplary embodiments may be recorded in a computer-readable recording medium by using various methods. Examples of the computer-readable recording medium include magnetic storage media (e.g., read only memories (ROMs), random access memories (RAMs), universal serial buses (USBs), floppy disks, hard disks, etc.) and storage media such as optical recording media (e.g., compact disc-ROMs (CD-ROMs) or digital video disks (DVDs)) and personal computer (PC) interfaces (PCIs) (e.g., PCI, PCI-express, Wi-Fi, etc.).

Although a few exemplary embodiments have been shown and described, it will be appreciated by those skilled in the art that changes may be made in these exemplary embodiments without departing from the principles and spirit of the disclosure, the range of which is defined in the appended claims and their equivalents.

What is claimed is:

1. A method of generating a tomography image, the method comprising:
    in response to a depth scan operation performed on an object, generating a candidate tomography image by using an interference signal acquired by the performed depth scan operation;
    determining a pixel pattern by using the generated candidate tomography image; and
    when the depth scan operation performed on the object is completed, determining a final pixel pattern corresponding to a candidate tomography image that is selected based on comparison among pixels of generated candidate tomography images, and generating a final tomography image of the object by using the final pixel pattern,
    wherein the generating the candidate tomography image and the determining the pixel pattern are parallel processed by at least one processor during the depth scan operation being repeatedly performed.

2. The method of claim 1, wherein the at least one processor parallel processes a first thread for performing the depth scan operation, a second thread for generating the candidate tomography image, and a third thread for determining the pixel pattern.

3. The method of claim 1, wherein the depth scan operation is repeatedly performed by using at least one from among a plurality of basis patterns and a plurality of shift patterns, the plurality of shift patterns being obtained by applying spatial shift modulation to the plurality of basis patterns.

4. The method of claim 3, wherein the plurality of basis patterns comprise uncorrelated patterns.

5. The method of claim 3, wherein the depth scan operation is repeatedly performed for each spot of a surface of the object by using the at least one from among the plurality of basis patterns and the plurality of shift patterns.

6. The method of claim 5, wherein the generating the final tomography image of the object is performed when the depth scan operation is completed for a spot of the surface of the object by using the at least one from among the plurality of basis patterns and the plurality of shift patterns.

7. The method of claim 1, wherein,
    the pixel pattern is a pixel pattern that is adjusted by a digital micromirror device (DMD), and
    the depth scan operation is repeatedly performed by using at least one from among a plurality of basis patterns and a plurality of shift patterns which are obtained through adjustment by the DMD.

8. The method of claim 1, wherein the determining comprises comparing intensities of pixels corresponding to a region of interest (ROI) of the object in one or more generated candidate tomography images and determining the pixel pattern according to a result of the comparison.

9. The method of claim 8, wherein the determining the pixel pattern comprises:
    comparing intensities in units of pixels of substantially the same depth within a depth range corresponding to the ROI;
    combining pixel patterns respectively corresponding to the generated one or more candidate tomography images, the combined pixel patterns comprising a pixel having a greatest intensity at every depth unit, according to a result of the comparing; and
    determining the pixel pattern by using the combined pixel patterns.

10. The method of claim 9, wherein the comparing and the combining are performed in units of a certain number of pixels.

11. The method of claim 9, wherein the combining comprises performing summation or weighted summation on corresponding pixel patterns.

12. The method of claim 1, wherein the depth scan operation is performed by at least one from among an optical coherent tomography (OCT) apparatus and an optical coherent microscopy (OCM) apparatus.

13. An apparatus for generating a tomography image, the apparatus comprising:
    at least one processor operable to read and operate according to instructions within a computer program; and
    at least one memory operable to store at least portions of the computer program for access by the at least one processor;

wherein the computer program includes algorithms to cause the at least one processor to implement:
an image generator configured to, in response to a depth scan operation performed on an object, generate a candidate tomography image by using an interference signal acquired by the performed depth scan operation; and
a pattern determiner configured to determine a pixel pattern by using the generated candidate tomography image, and wherein, when the depth scan operation is repeated on the object, the pattern determiner determines a final pixel pattern corresponding to a candidate tomography image that is selected based on comparison among pixels of generated candidate tomography images, and the image generator generates a final tomography image of the object by using the final pixel pattern, and during the depth scan operation being repeatedly performed, an operation of generating the candidate tomography image and an operation of determining the pixel pattern are parallel processed.

14. The apparatus of claim 13, wherein the at least one processor parallel processes a first thread for performing the depth scan operation, a second thread for generating the candidate tomography image, and a third thread for determining the pixel pattern.

15. The apparatus of claim 13, wherein the depth scan operation is repeatedly performed by using at least one from among a plurality of basis patterns and a plurality of shift patterns of a spatial light modulator, the plurality of shift patterns being obtained by applying spatial shift modulation to the plurality of basis patterns.

16. The apparatus of claim 15, wherein the spatial light modulator comprises a digital micromirror device (DMD).

17. The apparatus of claim 13, wherein the pattern determiner compares intensities of pixels corresponding to a region of interest (ROI) of the object in one or more generated candidate tomography images and determines the pixel pattern according to a result of the comparison.

18. The apparatus of claim 17, wherein,
the pattern determiner comprises:
an intensity comparator configured to compare intensities in units of pixels of substantially the same depth within a depth range corresponding to the ROI; and
a pattern combiner configured to combine pixel patterns respectively corresponding to the generated one or more candidate tomography images, the combined pixel patterns comprising a pixel having a greatest intensity at every depth unit, according to a result of the comparison, and
the pattern determiner determines the pixel pattern by using the combined pixel patterns.

19. The apparatus of claim 18, wherein the intensity comparator compares the intensities, and the pattern combiner combines the corresponding pixel patterns, in units of a certain number of pixels.

20. A method of generating a tomography image, the method comprising:
generating, in a first period, a first candidate tomography image by using an interference signal acquired by a first depth scan operation performed on an object;
determining, in the first period, a pixel pattern by using the generated first candidate tomography image;
generating, in a second period, a second candidate tomography image by using an interference signal acquired by a second depth scan operation performed on the object;
updating the determined pixel pattern based on a pixel pattern corresponding to a candidate tomography image that is selected based on comparison among pixels of the first and second candidate tomography images; and
generating a final tomography image of the object by using the updated determined pixel pattern.

* * * * *